(12) United States Patent
Someya et al.

(10) Patent No.: US 7,651,438 B2
(45) Date of Patent: Jan. 26, 2010

(54) VEHICLE WITH ENGINE CONTROL SYSTEM

(75) Inventors: Akira Someya, Iwata (JP); Daichi Noborio, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 402 days.

(21) Appl. No.: 11/742,346

(22) Filed: Apr. 30, 2007

(65) Prior Publication Data

US 2007/0265136 A1    Nov. 15, 2007

(30) Foreign Application Priority Data

May 9, 2006    (JP)    ............... 2006-130144

(51) Int. Cl.
*B60W 10/06*    (2006.01)
*B60W 10/10*    (2006.01)

(52) U.S. Cl. ............... 477/77; 477/90; 477/109; 477/905

(58) Field of Classification Search ............... 477/90, 477/905
See application file for complete search history.

(56) References Cited

U.S. PATENT DOCUMENTS 6,908,412 B2 *    6/2005    Kurabayashi ............... 477/44

7,384,374 B2 *    6/2008    Jiang ............... 477/120
2007/0026995 A1 *    2/2007    Doering ............... 477/107

FOREIGN PATENT DOCUMENTS

JP    2003-081537    4/1991

* cited by examiner

*Primary Examiner*—Sherry L Estremsky
*Assistant Examiner*—Edwin A. Young
(74) *Attorney, Agent, or Firm*—Keating & Bennett, LLP

(57) ABSTRACT

A vehicle, such as a motorcycle, which has an engine control system that is configured to reduce an output of the engine upon a determination that a shifting of the transmission, without a corresponding disengagement of the clutch, is likely to occur. In one arrangement, the vehicle includes a controller that is configured such that if a release rate of the accelerator, calculated on the basis of signals from an accelerator position sensor, has been equal to or larger than a threshold value for a period of time, and other conditions have been met, it is determined that snapping of the accelerator by the operator has been performed. The snapping is a release of the accelerator that is predicted to be accompanied by a transmission shift without disengagement of the clutch. In response to the snapping determination, the engine output is reduced for a reduction duration, such as by retarding the ignition timing, after the elapse of a predetermined stand-by time.

21 Claims, 12 Drawing Sheets

Operation amount threshold setting table

| Gear position | 0 (neutral) | First | Second | Third | Fourth | Fifth |
|---|---|---|---|---|---|---|
| Accelerator operation amount q1(°) | 100(MAX) | 60 | 60 | 60 | 60 | 60 |

Fig. 8

Ignition timing setting table

| Gear position | 0 (neutral) | First | Second | Third | Fourth | Fifth |
|---|---|---|---|---|---|---|
| Ignition timing (°) | | 5 | 5 | 5 | 0 | 0 |

Fig. 9

Duration setting table

| Gear position | O (neutral) | First | Second | Third | Fourth | Fifth |
|---|---|---|---|---|---|---|
| Duration of ignition retardation processing (ms) | | 60 | 60 | 60 | 50 | 50 |

Fig. 10

VEHICLE WITH ENGINE CONTROL SYSTEM

RELATED APPLICATIONS

This application is related to, and claims priority from, Japanese Patent Application No. 2006-130144, filed May 9, 2006, the entirety of which is hereby incorporated by reference herein and made a part of the present specification.

BACKGROUND OF THE INVENTION

1. Field of the Invention

The present invention relates to a straddle-type vehicle, such as a motorcycle. More particularly, the present invention relates to an engine control system for a vehicle.

2. Description of the Related Art

Straddle-type vehicles, such as motorcycles, often adopt a constant-mesh transmission. Such transmissions include gears provided on each of a main shaft and a drive shaft. A gear change is effected by selectively changing the combination of these gears through the operation of a shifter device, such as a shifter arm or change pedal ("shifter").

In a constant-mesh transmission, a driving force or output from the engine is transmitted via a clutch to the main shaft to be exerted on the drive shaft. Therefore, when a gear is to be changed, normally, the clutch is temporarily disengaged to release the driving force exerted on the drive shaft before performing a gear change.

However, some shift changes occur without a corresponding disengagement of the clutch. That is, under a state in which the accelerator position is significantly open and the engine driving force is large, accelerator release and opening operations are performed in quick succession (i.e., "snapping" or "blipping" is performed). This allows a gear change to be performed while the engine driving force is reduced for only a short period of time. The aforementioned operation is often referred to as "snapping."

A technique for effecting the above-mentioned shift change operation omitting disengagement of the clutch is disclosed in, for example, Japanese Patent Publication No. 03-081537. The straddle-type vehicle disclosed in the publication includes a throttle opening sensor that detects the opening of a throttle valve. Ignition retardation processing is performed at the timing at which a change in the opening of the throttle valve due to movement of an operator-activated accelerator is detected by the sensor, thereby reducing the engine driving force. Accordingly, the engine driving force is reduced by the ignition retardation processing, thereby making it possible to reduce the operating force required for operating the shifter.

SUMMARY OF THE INVENTION

More recently, straddle-type vehicles, equipped with an electronically-controlled throttle device having an accelerator position sensor that detects the position of the accelerator, and an actuator that drives a throttle valve, have started to appear on the market. In such a vehicle, the throttle valve is driven so as to open and close by the actuator in accordance with the accelerator position detected by the accelerator position sensor. One or more preferred embodiments of the present invention provide a vehicle including an electronically-controlled throttle device and that has an improved shift feeling when a transmission shift is carried out without disengagement of the clutch.

A preferred embodiment involves a vehicle having an engine that generates driving force. A clutch has a drive portion and a driven portion. The clutch selectively transmits or interrupts the driving force of the engine through engagement or disengagement, respectively, of the drive portion and the driven portion. A constant-mesh transmission is coupled to the driven portion of the clutch. An accelerator is operable by an operator of the vehicle to vary the driving force of the engine. An electronically-controlled throttle device includes an accelerator position sensor that detects a position of the accelerator, an intake air regulating valve for adjusting an intake air amount of the engine, an actuator for driving the intake air regulating valve, and a controller that controls the actuator in accordance with the position of the accelerator detected by the accelerator position sensor. A snapping detection mechanism detects snapping of the accelerator by the operator, which is a release of the accelerator that is predicted to be accompanied by a shift of the transmission without a corresponding disengagement of the clutch. The snapping detection mechanism determines the occurrence of snapping on the basis of the accelerator position detected by the accelerator position sensor. A driving force reducing device initiates a reduction in the driving force of the engine in response to detection of the snapping by the snapping detection mechanism.

A preferred embodiment involves a vehicle including an engine, a transmission, and a clutch that selectively transmits power between the engine and the transmission. An accelerator is movable by an operator of the vehicle between a closed position and an open position to vary the output of the engine. The accelerator is released when moving toward the closed position. An accelerator position sensor detects a position of the accelerator. An electronically-controlled air intake regulation valve is capable of varying a volume of intake air to the engine and that is responsive to movement of the accelerator. A controller is in communication with the accelerator position sensor and is capable of controlling an output of the engine. The controller initiates a reduction in the output of the engine for an output reduction duration in response to a release of the accelerator above a threshold release rate as determined by signals from the accelerator position sensor.

A preferred method of controlling the output of an engine of a vehicle involves detecting a position of an operator-controlled accelerator of the vehicle with an accelerator position sensor and determining a release rate of the accelerator based on a change in the position of the accelerator in a direction toward a closed position over a time period. A transmission shift without disengagement of a clutch of the vehicle is predicted based on the release rate being above a threshold release rate over the time period. An output of the engine is reduced when the shift without disengagement of the clutch is predicted.

In the vehicle described above, the reduction of the engine driving force is performed upon detecting the snapping of the accelerator by the operator. The snapping is detected on the basis of signals from the accelerator position sensor. As a result, the engine driving force reduction can be made in quick response to the snapping by the operator and timed appropriately with a gear change of the transmission by the operator. Accordingly, it is possible to inhibit or prevent a situation where the operating force required for operating the shifter is excessive, thereby improving the shifting feel.

BRIEF DESCRIPTION OF THE DRAWINGS

These and other features, aspects and advantages of the present invention are described below with reference to drawings of preferred embodiments of the invention, which are intended to illustrate, but not to limit, the present invention. The drawings contain twelve (12) figures.

FIG. 8 is a preferred accelerator position threshold setting table for use by the control system of FIG. 4.

FIG. 9 is a preferred ignition timing setting table for use by the control system of FIG. 4.

FIG. 10 is a preferred duration setting table for use by the control system of FIG. 4.

DETAILED DESCRIPTION OF THE PREFERRED EMBODIMENTS

Figure 1:
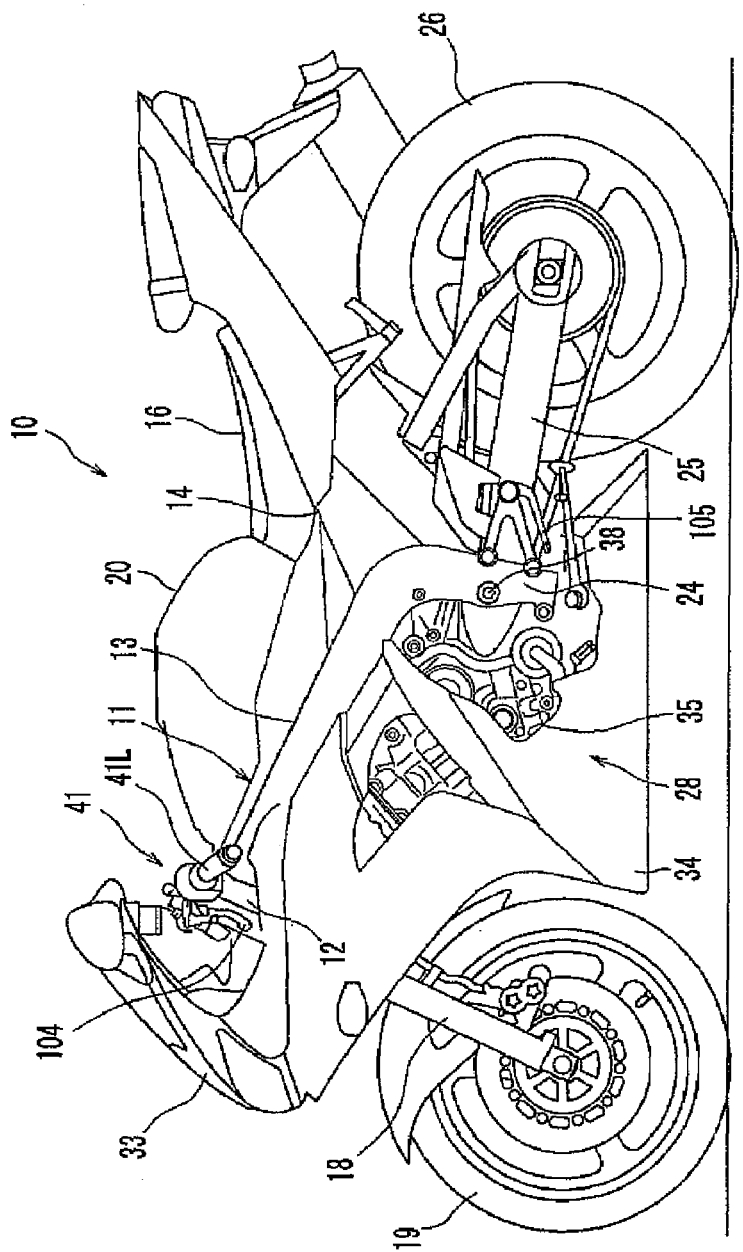
FIG. 1 is a side view of a motorcycle and related drive system, including an engine, transmission and engine control system. The motorcycle and drive system of FIG. 1 includes certain features, aspects and advantages of the present invention.

FIG. 1 illustrates a vehicle having certain features, aspects and advantages of the present invention. In particular, the illustrated vehicle is a motorcycle 10. The motorcycle 10 includes a body frame 11 constituting the framework of the motorcycle 10. A seat 16 is supported by the frame 11 and provides a location on which an operator of the vehicle can sit. The operator sitting on the seat 16 rides the motorcycle while straddling the body frame 11. It should be noted that in the vehicle is not limited to the motorcycle shown in FIG. 1, but the vehicle may be a so-called moped-type vehicle, as well. Further, there are no particular limitations on the maximum speed and displacement of the vehicle, the size of the vehicle, and the like. Moreover, the vehicle is not limited to a motorcycle, but may be another kind of straddle-type vehicle such as a four-wheeled buggy, all-terrain vehicle, snowmobile or other type of vehicle.

In the following description, the front, rear, left, and right directions refer to the directions as seen from the operator sitting on the seat 16, for the purpose of convenience only. The body frame 11 includes a steering head pipe 12, a main frame 13 extending diagonally downward in a rearward direction from the steering head pipe 12. Left and right seat rails 14 extending diagonally upward in a rearward direction from an intermediate portion of the main frame 13.

A front wheel 19 is supported relative to the steering head pipe 12 via a front fork 18. A fuel tank 20 and the seat 16 are supported on the main frame 13 and seat rails 14. The seat 16 extends from the rear of the fuel tank 20 towards the rear end of the seat rails 14.

A pair of left and right rear arm brackets 24 are provided at the rear end of the main frame 13. It should be noted that in this case, the rear arm brackets 24 and the like provided to the main frame 13 constitute a part of the body frame 11. The rear arm brackets 24 project downward from the rear end of the main frame 13. A pivot shaft 38 is provided to each of the rear arm brackets 24. The front end of a rear arm 25 is rotatably supported on the pivot shaft 38. A rear wheel 26 is supported on the rear end of the rear arm 25.

Further, an engine unit 28 for driving the rear wheel 26 is supported by the body frame 11. A crankcase 35 is supported in place while being suspended from the main frame 13. It should be noted that while the illustrated engine unit 28 is a gasoline engine (not shown), the engine provided in the engine unit 28 is not limited to an internal combustion engine such as a gasoline engine, but may be a motor (electric) engine or the like. Further, the engine may be a "hybrid" combining an internal combustion type engine and a motor or electric type engine. Thus, the term engine is to be interpreted broadly as a device or system that produces usable power for the vehicle.

The motorcycle 10 includes a front cowl 33, and left and right leg shields 34. The leg shields 34 are cover members for covering or protecting the front side of the legs of the operator.

Although not specifically shown in FIG. 1, a brake pedal is provided in a lower right-side portion of the motorcycle 10. The brake pedal is used for braking the rear wheel 26. Further, the front wheel 19 is braked by operating a brake lever 103 (see FIG. 2) provided near a right grip 41R (see FIG. 2) of a handlebar 41. A clutch lever 104 is provided near a left grip 41L of the handlebar 41. A clutch 54 (see FIG. 2) is engaged and disengaged by operation of the clutch lever 104. Further, a gear change pedal, shifter pedal or, simply, shifter 105 is provided in a lower left-side portion of the motorcycle 10. Gear change of a transmission 80 (see FIG. 2) is accomplished by operating the shifter 105.

Figure 2:
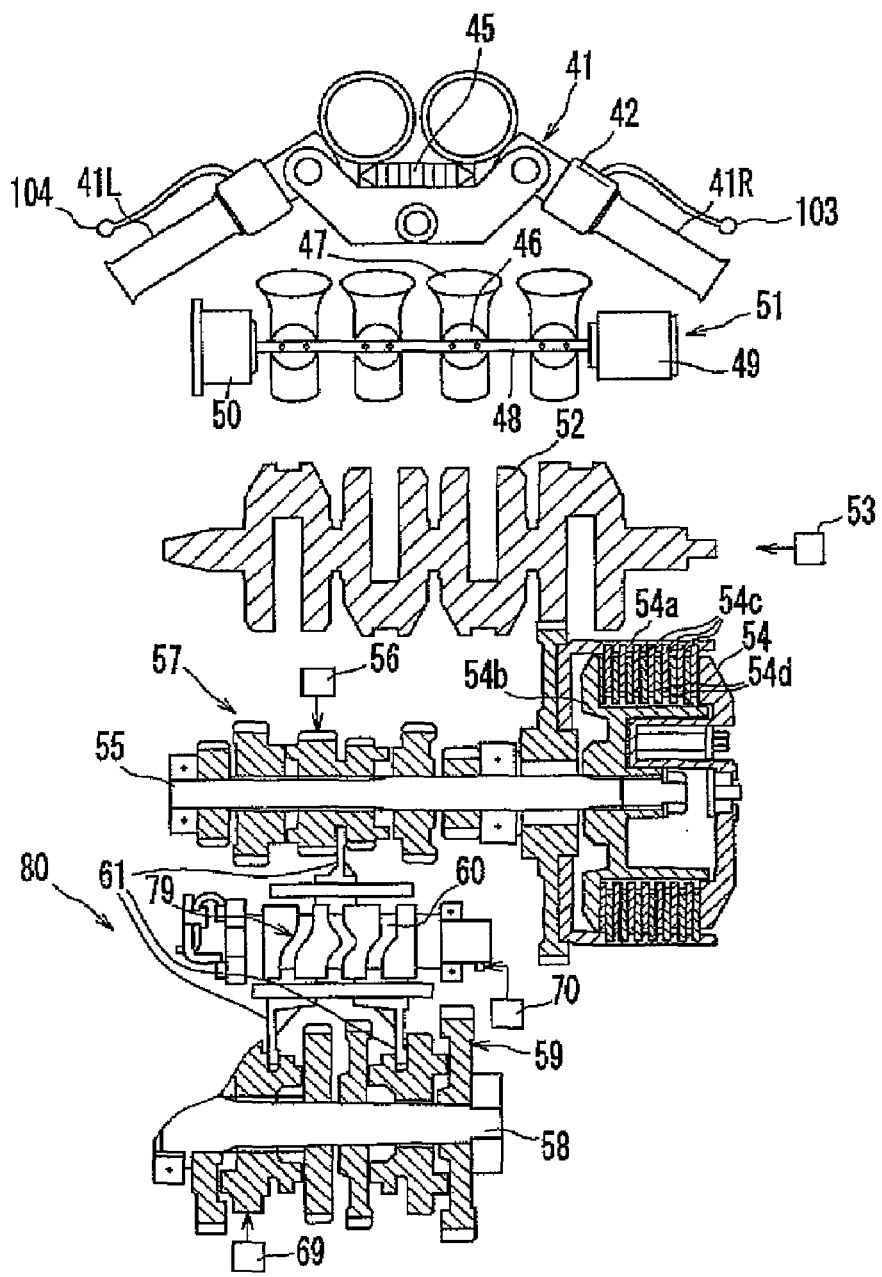
FIG. 2 is a structural diagram of the drive system of the motorcycle of FIG. 1.

FIG. 2 is a structural diagram of the drive system of the motorcycle 10 shown in FIG. 1. The right grip 41R of the handlebar 41 (see also FIG. 1) constitutes an accelerator grip, or accelerator. An accelerator input sensor 42 is mounted to the accelerator grip. The accelerator input sensor 42 may be referred to herein as an accelerator position sensor, and detects the amount of operation or position of the right grip 41 by the operator (hereinafter, referred to as the "accelerator position"). Further, a gear indicator 45 that indicates the current gear position is provided at the center of the handlebar 41. It should be noted that in this embodiment, the shift position can be upshifted or downshifted between neutral and gear ratios one through six by operating the shifter 105. In the illustrated arrangement, sixth gear is the highest gear ratio of the transmission.

An intake air regulation valve 46 regulates a volume of air that is introduced to the engine 28. In the illustrated arrangement, the intake air regulation valve 46 is a throttle valve mounted to a throttle 47, which constitutes an intake passage to the engine 28. However, other suitable types of intake air regulation devices may also be used. For example, in one arrangement, the intake valve of the engine 28 may be used to regulate the supply of intake air to the engine 28. In the illustrated arrangement, a throttle driving actuator 49 is provided at the right-side end of a valve shaft 48 of the throttle valve 46, and a throttle opening sensor 50 is provided at the left-side end thereof. The right grip 41R, which serves as the accelerator grip, the throttle 47, the throttle driving actuator 49, and the throttle opening sensor 50 constitutes an electronically-controlled throttle device 51, in the illustrated embodiment. However, as noted above, these particular devices may be replaced with other devices or systems that accomplish the same or substantially the same function.

An engine rotational speed sensor 53 is provided on the right side of the right end of the crankshaft 52 of the engine unit 28 (see FIG. 1). The crankshaft 52 is connected to a main shaft 55 via the clutch 54 of a multi-plate wet type. The clutch 54 includes a clutch housing 54a and a clutch boss 54b. A plurality of friction plates 54c are rotatable with the clutch housing 54a. Further, a plurality of clutch plates 54d are rotatable with the clutch boss 54b. Each of the clutch plates 54d is arranged between adjacent friction plates 54c, 54c. By operating the clutch lever 104, the distance between the friction plates 54c and the clutch plates 54d changes, thereby effecting engagement and disengagement of the clutch 54. That is, when the clutch 54 is engaged, a squeezing force is applied to the plates 54c, 54d such that the plates 54c, 54d are frictionally engaged to transmit a drive force therebetween. When the clutch 54 is disengaged, the squeezing force is released to a sufficient extent to permit relative motion between the plates 54c, 54d such that the transmission of a drive force through the clutch 54 is reduced or eliminated. Further, it should be noted that the clutch 54 is not limited to a wet multi-plate type clutch. For example, the clutch 54 may be a dry clutch or a single plate type clutch. Multiple (six in FIG. 2) transmission gears 57 are mounted to the main shaft 55. A main-shaft rotational speed sensor 56 is also mounted to the main shaft 55. Each of the transmission gears 57 mounted to the main shaft 55 is in meshing engagement with each corresponding one of transmission gears 59 mounted on a drive shaft 58. The drive shaft 58 is arranged in parallel to the main shaft 55. It should be noted that in FIG. 2, the transmission gears 57 and the transmission gears 59 are depicted as being separated from each other for the purpose of convenience in describing the transmission.

Except for the selected gears, one or both of the transmission gears 57 and 59 are mounted in an idling state with respect to the main shaft 55 or the drive shaft 58. Accordingly, transmission of driving force from the main shaft 55 to the drive shaft 58 is accomplished only via the pair of transmission gears being selected. It should be noted that a state where a pair of transmission gears 57 and 59 are in meshing engagement with each other in a state with driving force being transmitted from the main shaft 55 to the drive shaft 58 corresponds to a gear-in state.

The operation of performing a gear change through selection of the transmission gears 57 and transmission gears 59 is accomplished by a shift cam 79. The shift cam 79 has a plurality of (three in FIG. 2) cam grooves 60 formed therein. Shift forks 61 are fitted in the respective cam grooves 60. Each shift fork 61 is in engagement with predetermined transmission gears 57 and 59 of the main shaft 55 and drive shaft 58, respectively. As the shift cam 79 rotates, the shift forks 61 move in the axial direction along the cam grooves 60. Then, in synchronization with this movement of the shift forks 61, predetermined transmission gears 57 and 59 that are spline-fitted onto the main shaft 55 and the drive shaft 58 move in the axial direction. Then, the transmission gears 57 and 59 that have moved in the axial direction come into engagement with other transmission gears 57 and 59 that are mounted to the main shaft 55 and the drive shaft 58 in an idling state, thereby effecting a gear change. In the illustrated arrangement, the transmission gears 57 and 59, and the shift cam 79 constitute the transmission 80.

Figure 3:
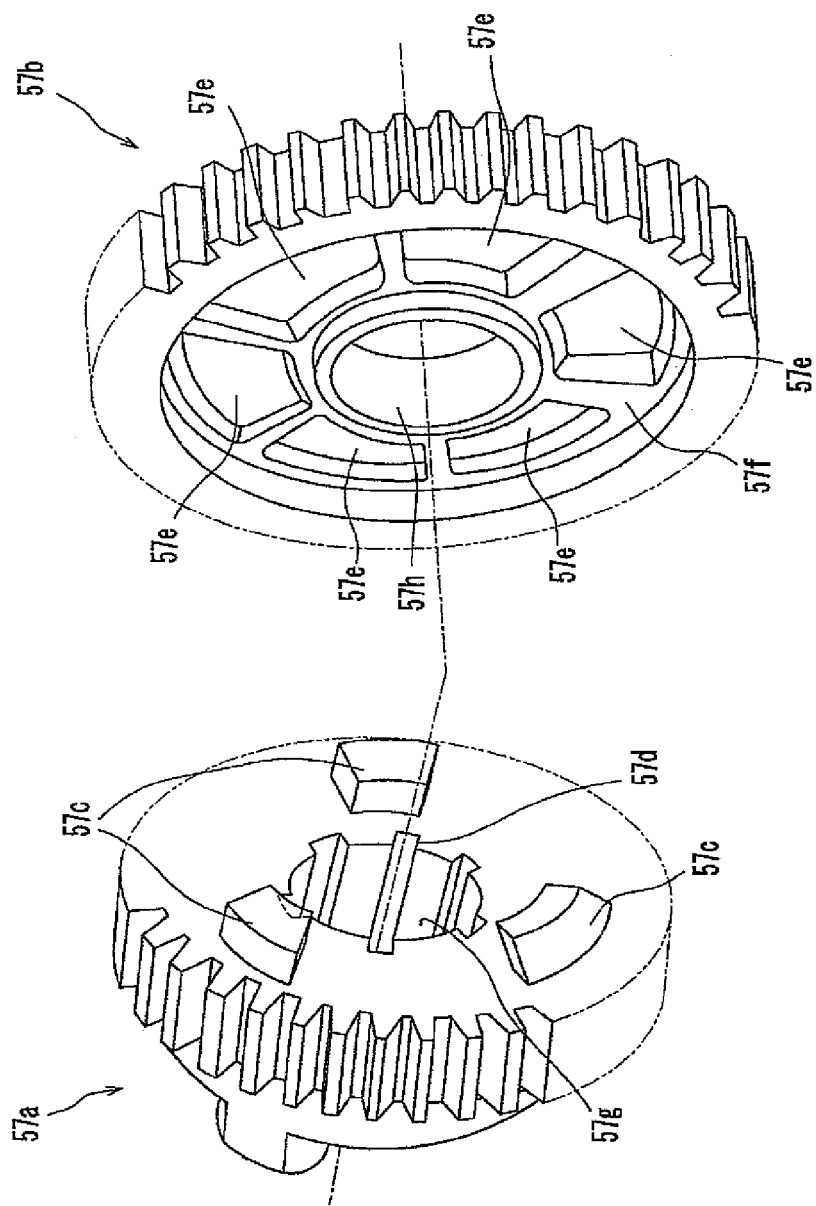
FIG. 3 is a perspective view of transmission gears of the transmission of FIG. 2.

The illustrated transmission 80 is a constant-mesh transmission. As shown in FIG. 3, the transmission 80 includes, as the transmission gear 57, a first gear 57a and a second gear 57b. The first gear 57a has engaging protrusions 57c formed in its axial end surface. The second gear 57b has engaging recesses 57e formed in an axial end surface opposed to the engaging protrusions 57c of the first gear 57a. The transmission 80 includes a plurality of the first gears 57a and second gears 57b. The transmission 80 includes, as the transmission gear 59, a plurality of the first gears in which the engaging protrusions are formed and a plurality of the second gears in which the engaging recesses are formed. However, because the first and second gears are of the same or substantially similar construction as those of the first gear 57a and second gear 57b shown in FIG. 3, description thereof is omitted. In the illustrated arrangement, three engaging protrusions 57c are formed in the first gear 57a. The engaging protrusions 57c are arranged on the outer periphery on the axial end surface of the first gear 57a at equal circumferential intervals. Further, six engaging recesses 57e are formed in the second gear 57b. The engaging recesses 57e are also arranged at equal circumferential intervals.

Further, an insertion hole 57g through which the main shaft 55 and the drive shaft 58 are inserted is formed at the axial center of the first gear 57a. A plurality of grooves 57d are formed in the peripheral surface of the insertion hole 57g. The first gear 57a is spline-fitted onto the main shaft 55 and the drive shaft 58. On the other hand, although an insertion hole 57h through which the main shaft 55 and the drive shaft 58 are inserted is also formed in the second gear 57b, no groove is formed in the insertion hole 57h. The second gear 57b is thus mounted to the main shaft 55 and the drive shaft 58 in an idling state, such that the second gear 57b is rotatable about the main shaft 55 and drive shaft 58.

When performing a gear change, the shifter 105 (see FIG. 1) is operated to rotate the shift cam 79 (see FIG. 2). As the shift cam 79 rotates, the shift forks 61 move along the cam grooves 60. In synchronization with this movement, the first gear 57a moves in the axial direction along the splines of the main shaft 55 and drive shaft 58. Further, the engaging protrusions 57c of the first gear 57a come into engagement with the engaging recesses 57e of the second gear 57b, so the combination of transmission gears 57 and 59 for transmitting driving force from the main shaft 55 to the drive shaft 58 is switched, thereby effecting a gear change.

Installed in the transmission mechanism between the clutch lever 104 (see also FIG. 1) and the clutch 54 is a clutch position sensor 68 (see FIG. 6) for detecting the clutch position, whether engaged or disengaged (e.g., the spacing or distance between the friction plates 54c and the clutch plates 54d). It should be noted that in this embodiment, the clutch position may be acquired on the basis of a clutch rotational speed difference, rather than a physical measurement of the position of a portion of the clutch 54. The clutch rotational speed difference refers to a difference between the rotational speed on the drive side and the rotational speed on the driven side of the clutch 54. The clutch rotational speed difference can be calculated on the basis of the detection result of the engine rotational speed sensor 53 and the detection result of the main-shaft rotational speed sensor 56. In addition, other suitable methods of determining whether the clutch 54 is engaged or disengaged, and appropriate sensors, may be utilized.

A vehicle speed sensor 69 is mounted to the drive shaft 58. Further, a gear position sensor 70 for detecting the gear position (such as by the rotational position of the shift cam) is mounted to the shift cam 79.

Figure 4:
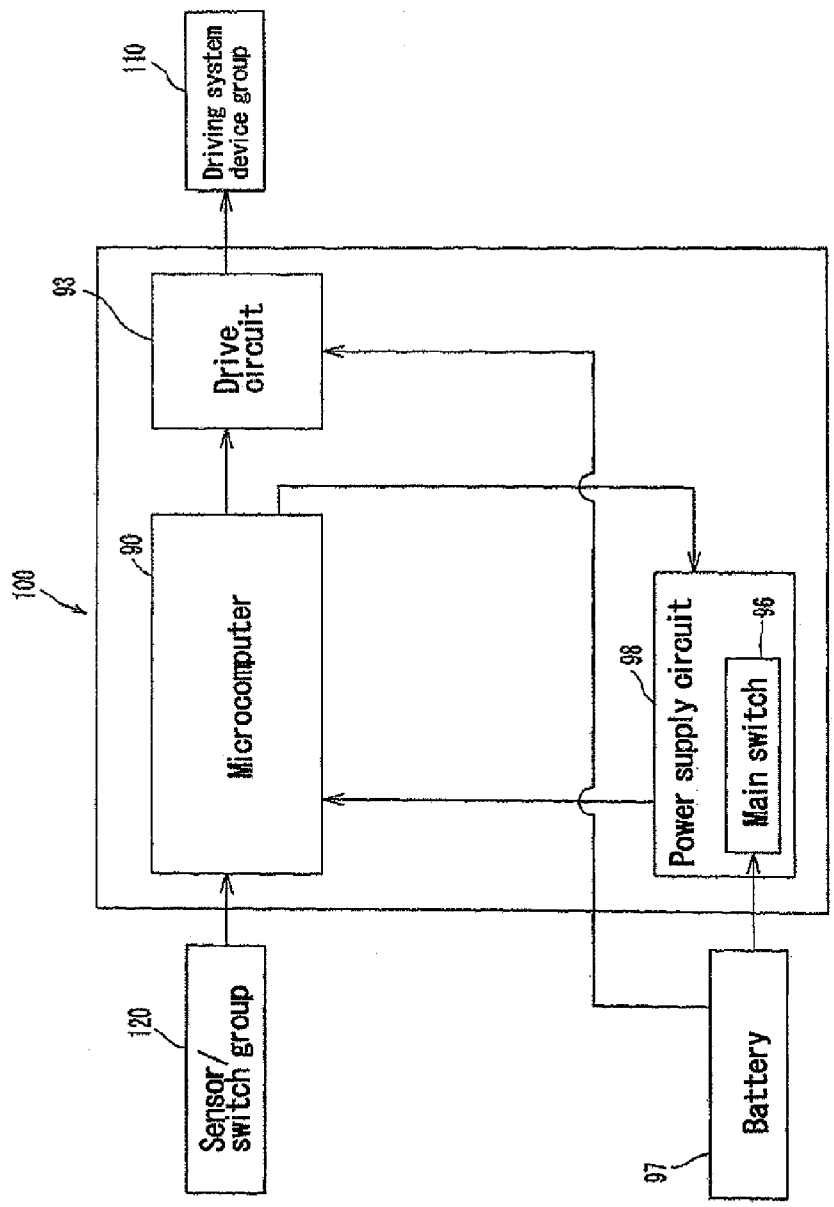
FIG. 4 is a block diagram of one preferred configuration of a control system of the motorcycle of FIG. 1.
Figure 5:
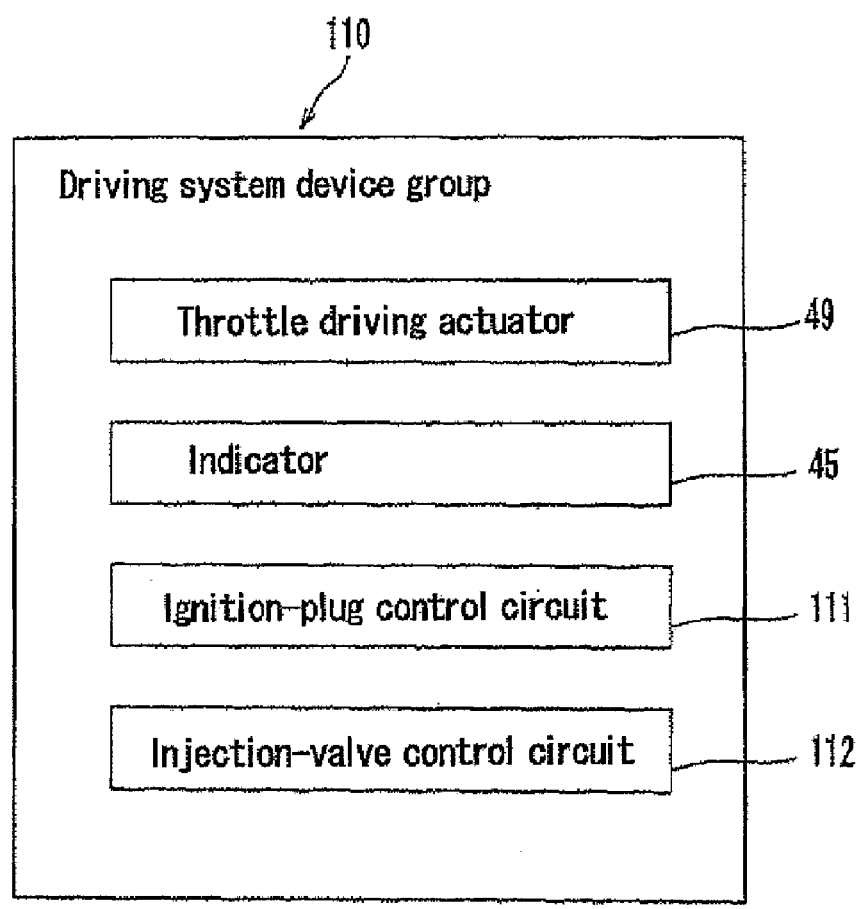
FIG. 5 is a block diagram of a preferred drive system device group of the control system of FIG. 4.

FIG. 4 is a block diagram illustrating a preferred control system incorporated in the motorcycle 10. A driving system device group 110 is connected via a drive circuit 93 to a main microcomputer 90 equipped to an electronic control unit or engine control unit (ECU) 100. It should be noted that the ECU 100 is one example of a controller. However, the controller may be of any suitable construction, and does not necessary consist of a single component. As shown in FIG. 5, the illustrated driving system device group 110 includes the intake air regulating valve or throttle valve driving actuator 49, the indicator 45 (see also FIG. 2), an ignition-plug or spark plug control circuit 111, and an injection-valve control circuit 112. The ignition-plug control circuit 111 controls the ignition timing of an ignition plug or spark plug of the engine (not shown). The injection-valve control circuit 112 controls the injection amount of a fuel injection valve (not shown), or otherwise controls the amount of fuel delivered to the engine.

Figure 6:
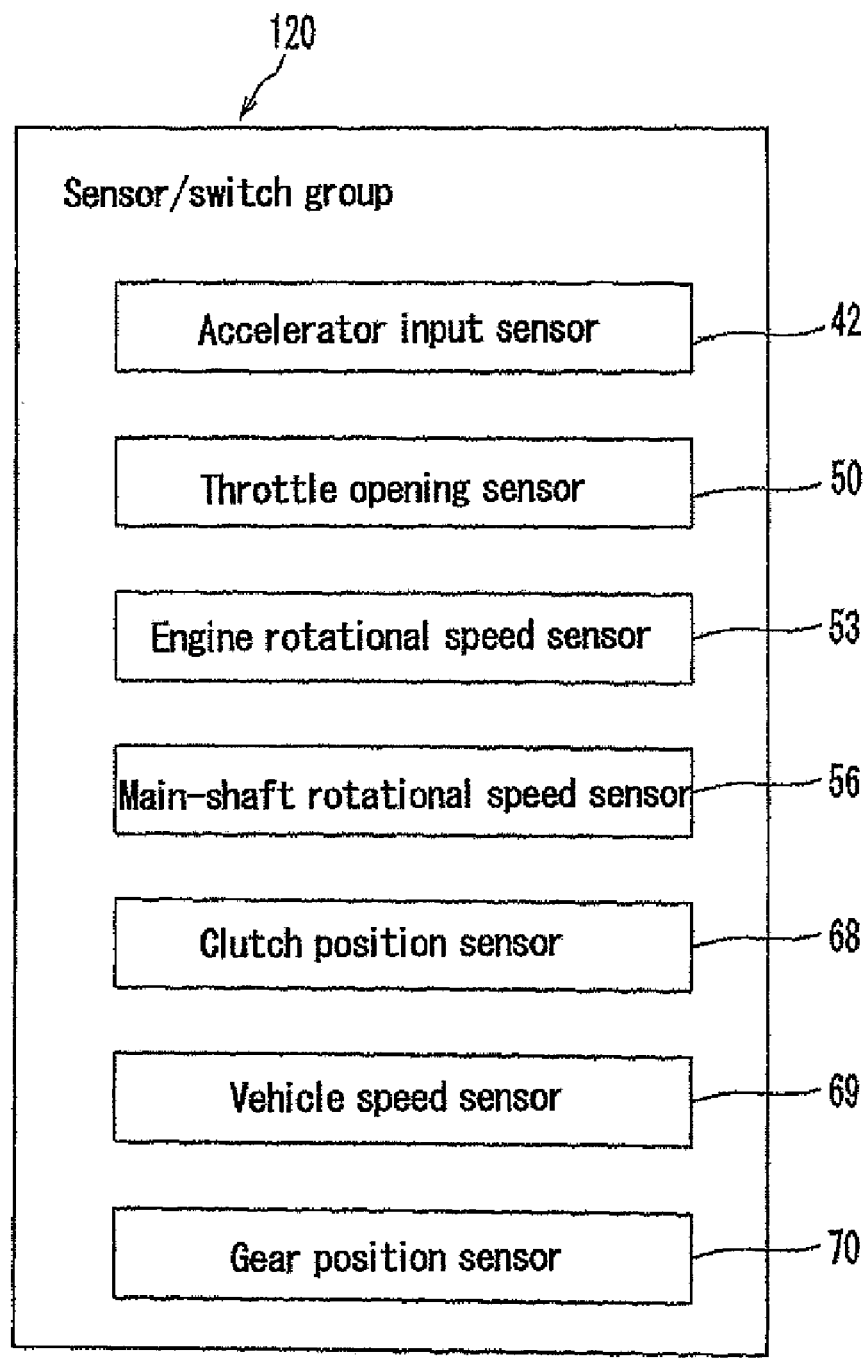
FIG. 6 is a block diagram of a preferred sensor/switch group of the control system of FIG. 4.

In accordance with a drive signal supplied from the main microcomputer 90, the drive circuit 93 causes appropriate current to be supplied from a battery 97 to each of devices constituting the driving system device group 110. A sensor/switch group 120 is connected to the main microcomputer 90. As shown in FIG. 6, the sensor/switch group includes the accelerator position sensor 42, the throttle valve opening sensor 50, the engine rotational speed sensor 53, the mainshaft rotational speed sensor 56, the clutch position sensor 68, the vehicle speed sensor 69, and the gear position sensor 70 (see also FIG. 2). The detection results from the respective sensors 42, 50, 53, 56, 68, 69, and 70 are input into the main microcomputer 90. On the basis of the detection results input from the respective sensors mentioned above, the main microcomputer 90 supplies a drive signal to each of the devices constituting the driving system device group 110 to thereby control that device.

A power supply circuit 98 connected to the battery 97 includes a main switch 96 that is switched ON/OFF in synchronization with a key switch (not shown). When the main switch 96 is turned ON, the power supply circuit 98 converts the voltage of the battery 97 into a drive voltage for the microcomputer 90 for supply to the microcomputer 90.

Figure 7:
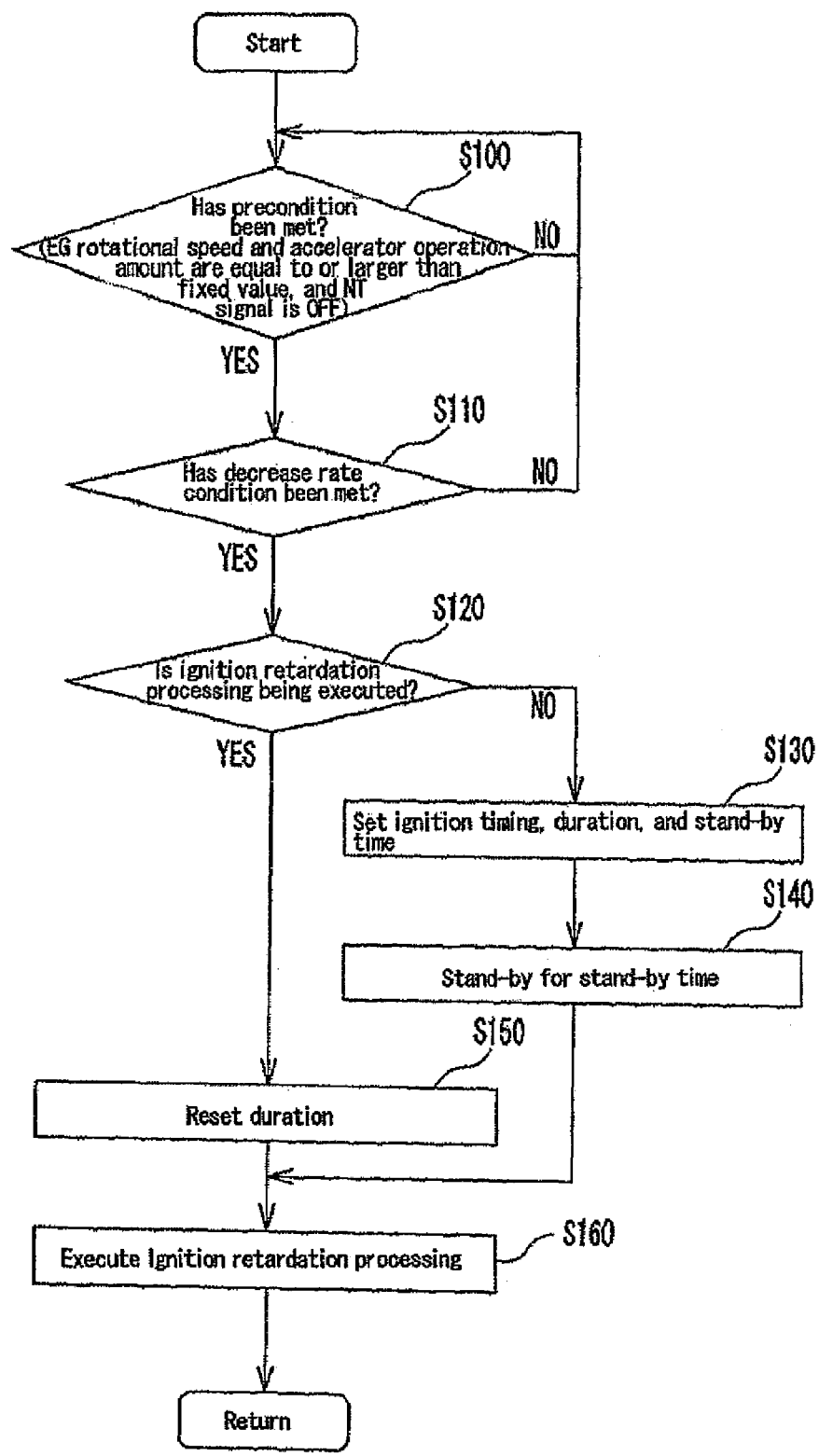
FIG. 7 is an operational flowchart for the reduction of a power output of the engine in accordance of one preferred embodiment of the control system of FIG. 4.

FIG. 7 is a flowchart illustrating a control arrangement for reduction of the driving force of the motorcycle 10. This control arrangement for reduction of the driving force is processing for reducing the engine driving force when snapping (or blipping) of the accelerator of the motorcycle 10 by the operator is detected. This control arrangement for reduction of the driving force is called up from a previously executed main routine and executed.

First, in the step S100, the ECU 100 determines whether or not one or more preconditions have been met. This precondition represents conditions related to the engine rotational speed (EG rotational speed), the accelerator position, and a neutral signal (NT signal) indicating whether or not the clutch 54 is disengaged or engaged. The precondition represents a condition to be met for making a determination that snapping of the accelerator has been performed. Specifically, in the step S100, the ECU 100 makes a determination as to the following three conditions: whether or not the engine rotational speed is equal to or larger than a predetermined threshold value N1; whether or not the accelerator position is equal to or larger than a predetermined threshold value θ1; and whether or not the neutral signal is OFF (whether or not the clutch 54 is engaged). The precondition is determined to have been met when all of the three conditions mentioned above are met. It should be noted that in this embodiment, the accelerator position refers to the rotation angle of the right grip 41R (see FIG. 2) serving as the accelerator grip.

The predetermined threshold value θ1 of the accelerator position described above is set on the basis of an operation amount threshold setting table shown in FIG. 8. As shown in FIG. 8, the predetermined threshold value θ1 is set on the basis of the current gear position. When the gear position is neutral, the predetermined threshold value θ1 is 100°, and when the gear position is between first and sixth gear, the predetermined threshold value θ1 is 60°. In this embodiment, the accelerator position at the time when the accelerator is rotated to the fully open position is 85°. Accordingly, as a precondition, when the gear position is neutral, the accelerator position does not exceed θ1, even at a fully open position. Therefore, in the state where the gear position is neutral, ignition retardation processing described later is not performed. It should be noted that the specific numerical value of θ1 is not particularly limited, but can be set to any appropriate or desired value.

If it is determined in the step S100 that the precondition has not been met, the processing is returned to step S100 and held in stand-by until the precondition is met. On the other hand, if it is determined that the precondition has been met, then, in step S110, it is determined whether or not a release rate condition has been met.

In this embodiment, the determination as to whether or not the release rate condition has been met is effected by determining whether or not the following condition has been met. That is, it is determined whether or not a state during which the release rate v of the accelerator (i.e., the rate of movement of the accelerator towards the closed position) is equal to or larger than a predetermined threshold value v1 has continued for a predetermined threshold period of time T1. Specifically, the release rate v of the accelerator position during each minute period of time (T1/n) is calculated on the basis of the detection result of the accelerator position sensor 42, and it is determined whether or not the calculated release rate v has become equal to or larger than a predetermined threshold value v1 n consecutive times. It should be noted that in this embodiment, the predetermined threshold period of time T1 can be set to be within the range of, for example, about 10 to 30 milliseconds (ms). However, other desired time ranges can also be used. If it is determined that the release rate v has become equal to or larger than the predetermined threshold value v1 n consecutive times, then the release rate condition is determined to have been met. It should be noted that the release rate v of the accelerator position refers to a rate of change in the decreasing direction of the accelerator position. Accordingly, the release rate v becomes a positive value during release of the accelerator position (while the accelerator is being returned), and becomes a negative value during increase of the accelerator position (while the accelerator is being opened). It should be noted that when executing the processing of steps S100 and S110 described above, the ECU 100 functions as a snapping detection mechanism. Further, in the step S110, when calculating the release rate v of the accelerator position on the basis of the detection result of the accelerator position sensor 42, the ECU 100 functions as a release rate calculator.

If it is determined in the step S110 that the release rate condition has not been met, the processing is returned to step S100. On the other hand, if it is determined that the release rate condition has been met, then, in step S120, it is determined whether or not ignition retardation processing is being executed. In this processing, it is determined whether or not ignition retardation processing, which is carried out in step S160 described below, is being executed.

If it is determined in step S120 that ignition retardation processing is not being executed, then, in the step S130, the processing of setting the ignition timing, duration, and standby time is carried out. The above-mentioned ignition timing refers to timing at which ignition is performed by an ignition plug or spark plug (not shown) when performing ignition retardation processing. Further, the above-mentioned duration refers to a period of time for which ignition retardation processing is carried out through the processing of step S160 that is described below. Further, the above-mentioned stand-by time refers to a period of time for which the processing is held in stand-by until the above-mentioned ignition retardation processing is started. It should be noted that in the illustrated embodiment, a fixed period of time is set as the above-mentioned stand-by time. This fixed period of time can be set within the range of, for example, about 10 to 30 ms. However, other suitable time periods may also be used, including no stand-by time.

The above-mentioned ignition timing is set on the basis of an ignition timing setting table shown in FIG. 9. However, in other arrangements, the ignition timing may be set in accordance with a protocol based on input from various sensors and, thus, is not necessarily predetermined. It should be noted that as for the ignition timing in this ignition timing setting table, with the top dead center of the piston taken as a reference (=0°), a value on the advancing side with reference to the top dead center is represented as a positive value, and a value on the retarding side with reference to the top dead center is represented as a negative value. As shown in FIG. 9, the ignition timing is set on the basis of the current gear position. When the gear position is between the first and third gear, the ignition timing is set to about 5°, and when the gear position is either the fourth or fifth gear, the ignition timing is set to about 0°. It should be noted that the smaller the value set as the ignition timing, the larger the reduction in engine driving force due to ignition retardation processing described below. Accordingly, as shown in FIG. 9, in this embodiment, the reduction in engine driving force is significantly larger when in a high gear position (fourth or fifth gear) as compared with when in a low gear position (first to third gear). It should be noted that in this embodiment, the ignition timing in the case where ignition retardation processing is not performed is set to reference timing (for example, a predetermined value within the range of about 0 to 50° (angle toward the advancing side with reference to the top dead center); in this embodiment, about 30°.

Further, the above-mentioned duration is set on the basis of a duration setting table shown in FIG. 10. As shown in FIG. 10, the duration of ignition retardation processing is set on the basis of the current gear position. When the gear position is between first and third gear, the duration is set to about 60 (ms), and when the gear position is fourth or fifth gear, the duration is set to about 50 (ms). Accordingly, when in a low gear position (first to third gear), ignition retardation processing is performed for a longer period of time as compared with when in a high gear position (fourth or fifth gear).

In the illustrated arrangement, after the processing of step S130 is executed, then, in step S140, the processing is held in stand-by for the stand-by time set in the step S130. Ignition retardation processing is not performed during this stand-by period. By performing ignition retardation processing after stand-by for the stand-by time, the stroke time corresponding to the amount of play of the shifter 105 can be absorbed. As a result, a shift change can be accomplished with a natural feel.

If it is determined in the processing of step S120 described above that ignition retardation processing is being executed, then, in step S150, the processing of resetting the duration is performed. In this processing, the ECU 100 resets the duration of ignition retardation processing on the basis of the duration setting table shown in FIG. 10. As described above, in this embodiment, when, during the execution of ignition retardation processing, it is determined that the precondition has been met in the processing of step S100, and that the release rate condition has been met in the processing of step S120, the duration is reset so that the period of time for which ignition retardation processing is executed is extended. In this way, according to this embodiment, the duration of ignition retardation processing is extended if snapping is performed again during ignition retardation processing. Accordingly, when snapping is performed again during ignition retardation processing, the series of processing from the cancellation of ignition retardation processing to the resumption of ignition retardation processing is not performed.

After the processing of step S150 is executed, then, ignition retardation processing is performed in the step S160. That is, the ECU 100 transmits a control signal to the ignition-plug control circuit 111 (see FIG. 5), and changes the ignition timing of the ignition plug so as to be retarded with respect to the reference timing (about 30° in the illustrated arrangement). The ignition timing retarding processing according to step S160 is performed on the basis of the ignition timing set in the step S130, and the duration set in step S130 or step S150. After the processing of step S160 is executed, the driving force reducing processing is ended. It should be noted that when executing the above-mentioned processing of step S160, the ECU 100 and the ignition plug control circuit 111 each function as a driving force reducing device. In the above described control arrangement, predetermined threshold tables are used in making certain determinations. However, the present invention is not limited to predetermined threshold levels, but may obtain the particular threshold levels by other means, such as by calculations based on sensor inputs, for example. Furthermore, the particular steps described in the control arrangement of FIG. 7 are exemplary. Thus, not all of the illustrated steps will necessarily be present in all embodiments of the invention. In addition, the particular order of the steps is exemplary and may be varied in other embodiments or arrangements of the engine control system.

Figure 11:
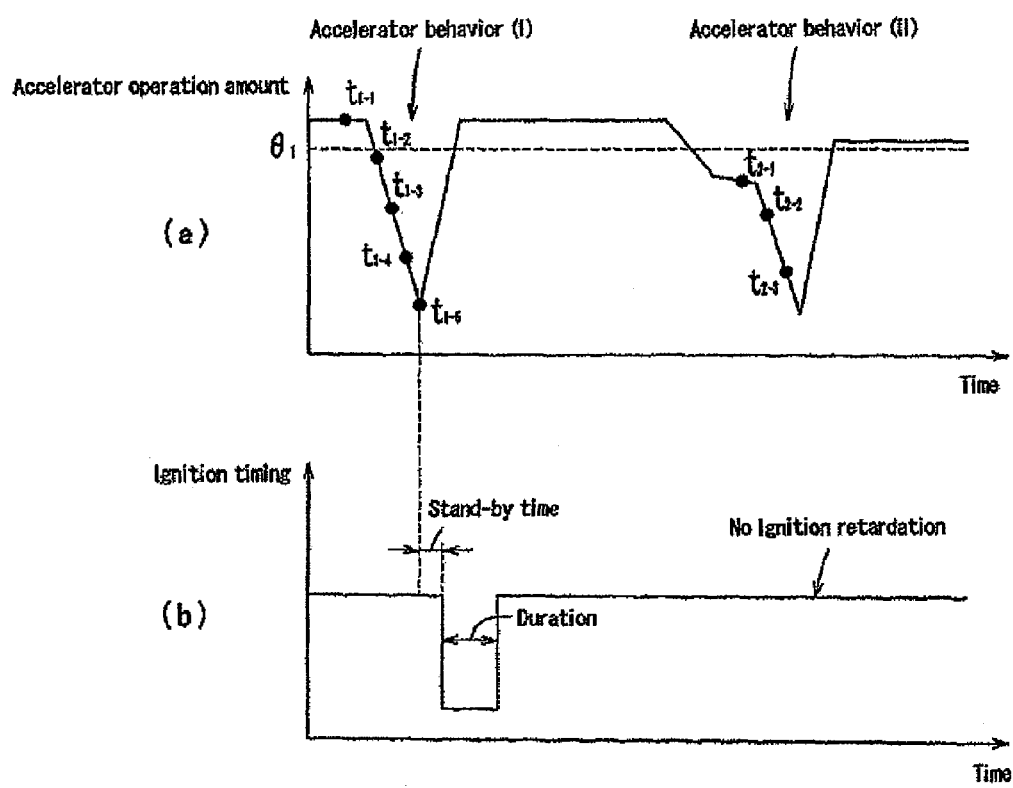
FIG. 11 is a diagram showing an example of changes of the accelerator position and ignition timing over time.

FIG. 11 is a diagram showing an example of changes of the accelerator position and ignition timing over time. FIG. 11(*a*) shows a change of accelerator position over time, and FIG. 11(*b*) shows a change of ignition timing over time. It should be noted that FIG. 11 illustrates a case where n=3 in step S110 of FIG. 7.

First, an accelerator behavior (I) on the left side of FIG. 11(*a*) is described. With respect to the accelerator behavior (I), at times t1-2, t1-3, and t1-4, the decrease rate of acceleration operation amount has been equal to or larger than the predetermined value v1 three consecutive times, so the release rate condition (see step S110 of FIG. 7) is satisfied. Further, at time t1-1, the engine rotational speed is equal to or larger than the predetermined threshold value N1, the accelerator position is equal to or larger than the predetermined threshold value θ1, and the clutch 54 is in engagement, so the precondition (see step S100 of FIG. 7) is satisfied. Accordingly, in the accelerator behavior (I), it is determined that snapping of the accelerator has been performed, so that, as shown in FIG. 11(*b*), ignition retardation processing is performed. At this time, the stand-by time from the time t1-4, at which it is determined that snapping has been performed, to the start of the ignition retardation processing, the ignition timing, and the duration of the ignition retardation processing are set in accordance with the processing of step S130 of FIG. 7.

At time t1-5 after the elapse of a predetermined period of time from the time t1-4, although the decrease rate condition is satisfied, the precondition is not satisfied because the accelerator position is less than θ1. Accordingly, no ignition retardation processing is performed after the time t1-5.

Next, an accelerator behavior (II) on the right side of FIG. 11(*a*) is described. With respect to the accelerator behavior (II), the decrease rate of accelerator position is large at times t2-2 and t2-3, so the decrease rate condition is satisfied. However, since the accelerator position is less than θ1 at time t2-1 that precedes the time t2-2, the above-mentioned precondition is not satisfied. Accordingly, no ignition retardation processing is performed in the accelerator behavior (II).

Figure 12:
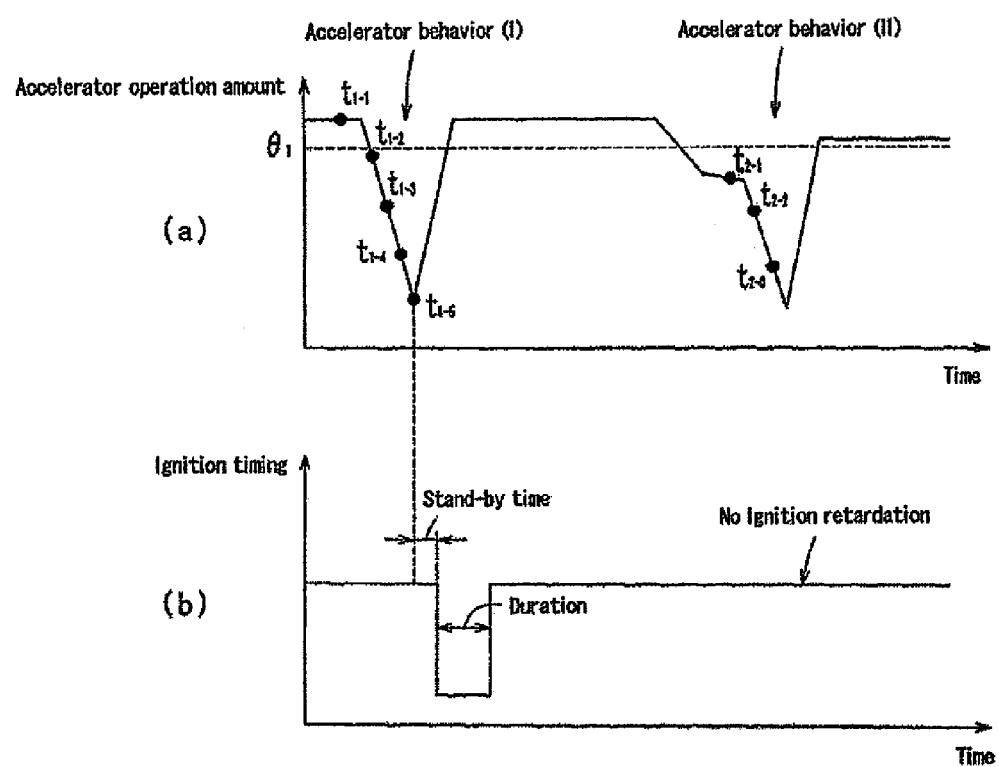
FIG. 12 is a diagram showing another example of changes of the accelerator position and ignition timing over time.

FIG. 12 is a diagram showing another example of changes of the accelerator position and ignition timing over time. FIG. 12 illustrates a case where snapping is determined to have been performed again during the execution of ignition retardation processing. A case is considered in which it is determined that snapping has been performed again at time t4-4 during the execution of ignition retardation processing. In this case, the duration of ignition retardation processing is reset (see step S150 of FIG. 7) when it is determined that the second snapping has been performed at the time t4-4, and the ignition retardation processing is extended for the reset duration from the time t4-4. It should be noted that in FIG. 12(b), the execution time of ignition retardation processing in the case where the second snapping has not been performed is indicated by the broken line.

As described above, in the motorcycle 10 according to this embodiment, in response to the detection of snapping of the accelerator by the operator on the basis of the release rate of the accelerator position, the engine driving force is reduced by ignition retardation processing. Accordingly, the start timing of ignition retardation processing can be set so that the ignition retardation processing quickly responds to snapping by the operator, thereby allowing the operator to operate the shifter 105 at appropriate timing. As a result, it is possible to prevent a situation where the operating force required for operating the shifter 105 becomes large, or the shock at the time of gear change becomes large due to deviation of the operating timing of the shifter 105 from the timing at which the engine driving force is reduced. An improvement in shift feeling can be thus achieved. Further, since the operator can operate the shifter 105 at appropriate timing, it is possible to prevent a large load from being exerted on the transmission gears 57 and 59, the shift forks 61, and the like at the time of gear change, thereby preventing degradation of the transmission gears 57 and 59, shift forks 61, and the like.

Further, the motorcycle 10 according to the illustrated embodiment can also be configured such that ignition retardation processing is executed even when slight snapping that actually provides little reduction in engine driving force is performed.

It should be noted that this embodiment may be configured such that the throttle valve opening (throttle valve or air intake regulating valve position) does not change during the execution of the ignition retardation processing (step S160) in the driving force reducing processing shown in FIG. 7. That is, while the ignition retardation processing is being executed, the throttle driving actuator 49 is not driven even when an accelerator operation has been performed, thereby keeping the throttle valve position constant or nearly constant. This makes it possible to prevent the engine driving force from changing due to a change in throttle opening during the execution of the ignition retardation processing.

Further, in the motorcycle 10 according to this embodiment, one of the conditions for determining that snapping has been performed is that the release rate v of the accelerator position calculated for each minute period of time (T1/n) has been equal to or larger than the predetermined value v1 n consecutive times. An improvement can be thus achieved in terms of detecting the return operation of the accelerator at the time of snapping.

Further, in the motorcycle 10 according to the illustrated embodiments, one of the conditions for determining that snapping has been performed is that the precondition (see step S100 of FIG. 7) is satisfied, that is, the following set of conditions are satisfied: the engine rotational speed is equal to or larger than the predetermined value N1; the accelerator position is equal to or larger than the predetermined value θ1; and the clutch 54 is in engagement. Since a shift change is generally performed under a state in which the engine rotational speed is high, the accelerator position is large, and the clutch 54 is in engagement, by adopting the above-described three conditions, an improvement can be achieved in terms of correctly determining the snapping by the operator.

Further, in the motorcycle 10 according to this embodiment, the ignition timing in the ignition retardation processing is set to a large value in the case where the transmission gear range prior to shift change is high (fourth or fifth gear). On the other hand, the ignition timing is set to a small value in the case where the transmission gear range prior to shift change is low (first to third gear). That is, in the case where the transmission gear range prior to shift change is high, the engine driving force to be reduced becomes large as compared with the case where the transmission gear range prior to shift change is low. Since the engine brake applied to the body of the motorcycle 10 becomes larger as the transmission gear range becomes lower, by setting the ignition timing in accordance with the transmission gear range in this way, an improvement in shift feeling can be achieved.

It should be noted that the present invention may be configured such that the engine driving force to be reduced becomes larger as the transmission gear range becomes lower. When the transmission gear range is low, the driving force applied to the transmission 80 becomes large, so the operating force required for operating the shifter 105 also becomes large. Accordingly, by setting the amount of reduction in engine driving force to be large when the transmission gear range is low, the operating force required for operating the shifter 105 can be reduced, thereby providing improved shift feeling.

In the motorcycle 10 according to the illustrated embodiments, the duration of the ignition retardation processing is set for each transmission gear range prior to shift change. Accordingly, it is possible to set the optimum duration for each transmission gear range by taking into account the rotational speed difference between the transmission gears 57 and 59, the configurations of the engaging protrusions 57c and engaging recesses 57e, and the like.

Further, in the motorcycle 10 according to the illustrated embodiments, the duration of the ignition retardation processing is set to be short in the case where the transmission gear range prior to shift change is high (in the case of the fourth or fifth gear), and set to be long in the case where the transmission gear range prior to shift change is low (in the case of the first to third gear). When the transmission gear range is low, the driving force applied to the transmission 80 becomes large, and the operating force required for operating the shifter 105 also becomes large. Accordingly, by setting the duration of the ignition retardation processing to be long in the case when the transmission gear range is low, the operating force on the shifter 105 can be reduced, thereby providing improved shift feeling.

While in the illustrated embodiments the description is directed to the case where ignition retardation processing is performed as the mechanism for achieving engine driving force reduction, the mechanism for reduction of engine driving force is not limited to the process illustrated and various kinds of processing can be adopted as the mechanism for reduction of engine driving force.

For example, the injection amount of fuel, or the amount of fuel delivered to the engine, may be performed as the above-mentioned mechanism for reduction of engine driving force. That is, a control signal may be transmitted to the injection-valve control circuit 112 to reduce the amount of fuel injection of a fuel injection valve (not shown). In this case, the ECU 100 and the injection-valve control circuit 112 each function as a driving force reduction mechanism.

Further, an intake air amount reduction, or the amount of air delivered to the engine, may be the mechanism for reduction of the engine driving force. For example, by transmitting a control signal to the throttle driving actuator 49 to adjust the opening of the throttle valve 47, the amount of intake air to the engine unit 28 may be reduced. In this case, the ECU 100 and the throttle driving actuator 49 each function as a driving force reduction mechanism.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present vehicle with engine control system has been described in the context of particularly preferred embodiments, the skilled artisan will appreciate, in view of the present disclosure, that certain advantages, features and aspects of the vehicle and system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A vehicle, comprising:
an engine that generates a driving force;
a clutch having a drive portion and a driven portion, the clutch selectively transmitting or interrupting the driving force of the engine through engagement or disengagement, respectively, of the drive portion and the driven portion;
a constant-mesh transmission coupled to the driven portion of the clutch;
an accelerator that is operable by an operator of the vehicle to vary the driving force of the engine;
an electronically-controlled throttle arrangement, comprising:
an accelerator position sensor that detects a position of the accelerator;
an intake air regulating valve that varies a volume of intake air to the engine;
an actuator that moves the intake air regulating valve; and
a controller that controls the actuator in accordance with the position of the accelerator detected by the accelerator position sensor;
a snapping detection mechanism that detects a snapping of the accelerator by the operator of the vehicle, wherein the snapping is a release of the accelerator that is predicted to be accompanied by a shifting of the transmission without disengagement of the clutch, wherein the snapping detection mechanism determines the occurrence of snapping of the accelerator on the basis of the position of the accelerator detected by the accelerator position sensor; and
a driving force reduction device that initiates a reduction in the driving force of the engine in response to detection of snapping by the snapping detection mechanism.

2. The vehicle of claim 1, further comprising a release rate calculator that calculates a release rate of the accelerator detected by the accelerator position sensor, wherein the snapping detection mechanism detects the snapping on the basis of the release rate calculated by the release rate calculator.

3. The vehicle of claim 2, wherein the release rate calculator calculates the release rate for a plurality of consecutive time periods, and the snapping detection mechanism determines that snapping has occurred when the release rate is equal to or larger than a predetermined value for a predetermined number of consecutive time periods.

4. The vehicle of claim 3, further comprising an engine speed sensor that detects a rotational speed of the engine, and a clutch position sensor that detects a clutch position of the clutch, wherein the snapping detection mechanism determines that the snapping has occurred when a rotational speed detected by the engine speed sensor is equal to or larger than a predetermined value, the position detected by the accelerator position sensor is equal to or above a predetermined opening position, and an engaged state of the clutch is detected by the clutch position sensor.

5. The vehicle of claim 4, wherein the predetermined opening position of the accelerator is set for each current transmission gear prior to shifting of the transmission.

6. The vehicle of claim 1, wherein a magnitude of the reduction of the engine driving force by the driving force reduction device is set for each current transmission gear prior to shifting of the transmission.

7. The vehicle of claim 6, wherein the magnitude of the reduction of the engine driving force is increased in a higher transmission gear relative to the magnitude of the reduction of the engine driving force in a lower transmission gear.

8. The vehicle of claim 6, wherein the magnitude of the reduction of the engine driving force is increased in a lower transmission gear relative to the magnitude of the reduction of the engine driving force in a higher transmission gear.

9. The vehicle of claim 1, wherein a period of time for which the reduction of the engine driving force occurs is set for each current transmission gear prior to shifting of the transmission.

10. The vehicle of claim 9, wherein the period of time for which the reduction of the engine driving force occurs is shorter in a higher transmission gear relative to the period of time for which the reduction of the engine driving force occurs in a lower transmission gear.

11. The vehicle of claim 1, wherein the driving force reduction device initiates a retarding of the ignition timing to reduce the driving force of the engine.

12. The vehicle of claim 1, wherein the driving force reduction device initiates a reduction in an amount of fuel delivered to the engine to reduce the driving force of the engine.

13. The vehicle of claim 1, wherein the driving force reduction device initiates a reduction in an amount of intake air delivered to the engine to reduce the driving force of the engine.

14. The vehicle of claim 1, wherein the vehicle is a motorcycle.

15. A vehicle, comprising:
an engine;
a transmission;

a clutch that selectively transmits power between the engine and the transmission;

an accelerator that is movable by an operator of the vehicle between a closed position and an open position to vary the output of the engine, wherein the accelerator is released when moving toward the closed position;

an accelerator position sensor that detects a position of the accelerator;

an electronically-controlled air intake regulation valve that is capable of varying a volume of intake air to the engine and that is responsive to movement of the accelerator;

a controller in communication with the accelerator position sensor and capable of controlling an output of the engine, wherein the controller initiates a reduction in the output of the engine for an output reduction duration in response to a release of the accelerator above a threshold release rate as determined by signals from the accelerator position sensor.

16. The vehicle of claim 15, wherein the controller initiates the reduction in the output of the engine only if the release rate is above the threshold over a plurality of consecutive time periods.

17. The vehicle of claim 16, wherein the controller initiates the reduction in the output of the engine only if the initial accelerator position prior to the release of accelerator is greater than or equal to a threshold opening position.

18. The vehicle of claim 16, further comprising an engine speed sensor and a clutch position sensor in communication with the controller, wherein the engine speed sensor detects a rotational speed of the engine and the clutch position sensor that detects whether the clutch is in an engaged position or a disengaged position, wherein the controller initiates the reduction in the output of the engine only if the rotational speed of the engine is above a threshold speed and the clutch is in an engaged position.

19. The vehicle of claim 15, wherein the reduction in the output of the engine is accomplished by one of a retarding of an ignition timing of the engine, a reduction in the fuel delivered to the engine, and a reduction in the amount of intake air delivered to the engine.

20. The vehicle of claim 15, wherein the engine comprises an internal combustion engine.

21. A method of controlling the output of an engine of a vehicle, comprising:

detecting a position of an operator-controlled accelerator of the vehicle with an accelerator position sensor;

determining a release rate of the accelerator based on a change in the position of the accelerator in a direction toward a closed position over a time period;

predicting a transmission shift without disengagement of a clutch of the vehicle, the prediction based on the release rate being above a threshold release rate over the time period; and reducing an output of the engine when the shift without disengagement of the clutch is predicted.

* * * * *